(12) United States Patent
Takeda et al.

(10) Patent No.: US 6,210,609 B1
(45) Date of Patent: *Apr. 3, 2001

(54) METHOD OF MANUFACTURING OPTICAL RECORDING MEDIUM

(75) Inventors: Minoru Takeda, Kanagawa; Toshiyuki Kashiwagi, Tokyo; Nobuyuki Arakawa, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 08/936,578

(22) Filed: Sep. 24, 1997

(30) Foreign Application Priority Data

Sep. 27, 1996 (JP) ................................................ 8-256644

(51) Int. Cl.[7] ........................................................ B29D 11/00
(52) U.S. Cl. ................... 264/1.33; 264/1.38; 264/1.6; 264/1.9; 264/2.1; 264/107; 425/810
(58) Field of Search ................................. 264/1.31, 1.33, 264/106, 107, 1.9, 1.7, 2.1, 1.36, 1.38, 1.6; 425/810

(56) References Cited

U.S. PATENT DOCUMENTS

| | | | |
|---|---|---|---|
| 3,989,436 | * 11/1976 | McNeely et al. ..................... | 425/810 |
| 4,447,381 | * 5/1984 | Matey ................................... | 264/107 |
| 4,535,434 | * 8/1985 | Kishi . | |
| 4,956,214 | * 9/1990 | Imataki et al. ....................... | 264/1.33 |
| 5,078,947 | * 1/1992 | Nishizawa et al. .................. | 264/107 |
| 5,189,531 | * 2/1993 | Palmer et al. ....................... | 264/1.31 |
| 5,728,324 | * 3/1998 | Welch et al. ........................ | 264/1.31 |

FOREIGN PATENT DOCUMENTS 368 442 A2    5/1990   (EP) .

* cited by examiner

Primary Examiner—Mathieu D. Vargot
(74) Attorney, Agent, or Firm—Ronald P. Kananen; Rader, Fishman & Grauer (57) ABSTRACT

In the method of manufacturing an optical recording medium according to the present invention, when an optical recording medium having at least first and second minute concave and convex surfaces formed thereon is manufactured, the first and second minute concave and convex surfaces are simultaneously molded on both surfaces of a substrate of the optical recording medium. Therefore, it is possible to manufacture a multilayer optical recording medium having an excellent symmetrical structure with respect to a vertical cross section direction of the substrate, i.e., in the thickness direction of the optical recording medium. Moreover, it is possible to effectively suppress the deformation thereof resulting from curing or shrinkage of an light curing resin or the like, absorption or removal of vapor in the air into or from a substrate, a transparent intermediate film or the like, and so on.

19 Claims, 10 Drawing Sheets

METHOD OF MANUFACTURING OPTICAL RECORDING MEDIUM

BACKGROUND

1. Field of the Invention

The present invention relates to a method of manufacturing an optical recording medium and particularly to a method of manufacturing an optical recording medium having at least two minute concave and convex surfaces or more.

2. Background of the Invention

An optical recording medium used for recording and/or reproducing information by irradiating rays of light includes a read-only memory (ROM) type, a write-once type, and a rewritable type. In the ROM type optical recording medium such as a compact disk, for example, a minute concave and convex surface such as a phase pit where a data information, a tracking servo signal and so on are recorded, a pregroove or the like is formed in its information recording layer. In the write-once type or rewritable optical recording medium such as a magneto-optical recording medium, a phase-change recording medium, a minute concave and convex surface such as a pregroove or the like is formed.

Figure 1:
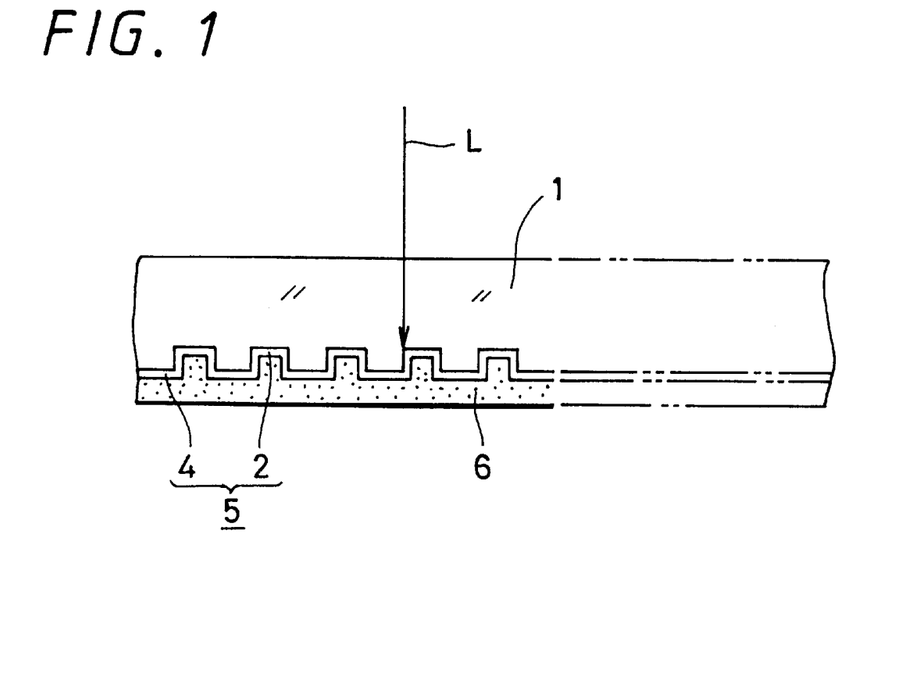
FIG. 1 is a schematic, cross-sectional view of a single-layer optical recording medium.

FIG. 1 is a schematic, cross-sectional view of an optical disk, e.g., a compact disk (CD).

When this optical recording medium is formed, a transparent substrate 1 made of polycarbonate or the like and having a thickness of 1.2 mm is formed by injection molding, and at the same time a minute concave and convex surface 2 such as a pregroove is formed. A reflective film 4 formed of an AL evaporated film or the like is formed on the minute concave and convex surface 2 so as to have a thickness of several tens of nm, thereby an information recording layer 5 formed of the minute concave and convex potion 2 and the reflective film 4 being formed. Further, a protective film 6 made of an ultraviolet curing resin, for example, and having a thickness of several $\mu$m is laminated on the information recording layer 5. Thus, the optical recording medium is formed.

An optical recording medium having a plurality of laminated information recording layers has been proposed in order to increase a recording information amount.

Figure 2:
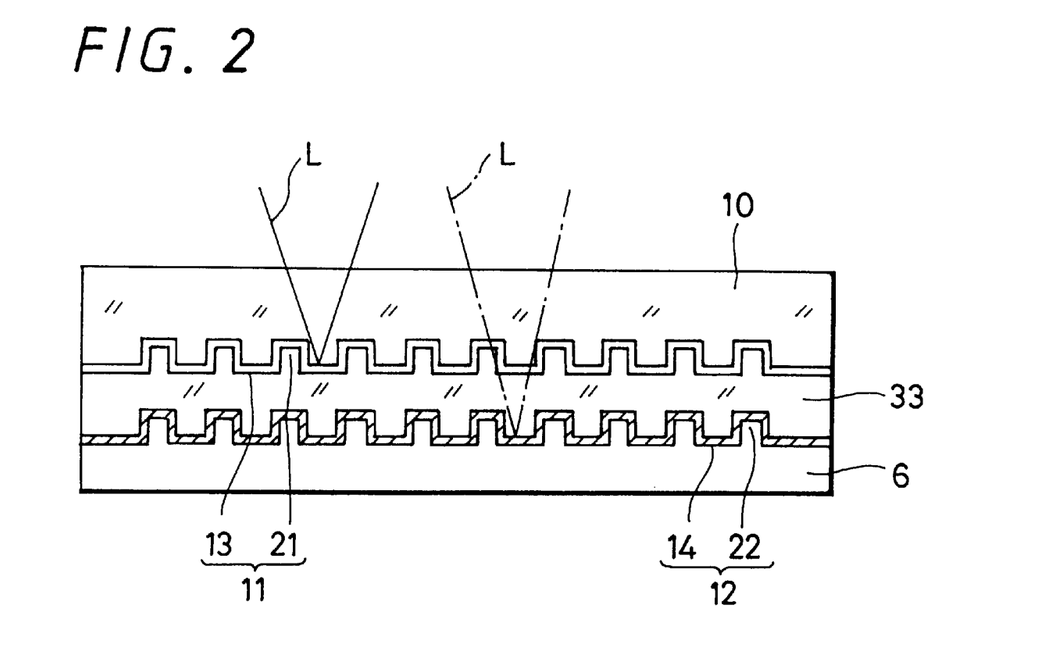
FIG. 2 is a schematic, cross-sectional view of a multilayer optical recording medium.

FIG. 2 is a schematic, cross-sectional view of an optical recording medium having a dilayer structure.

This optical recording medium is arranged such that first and second information recording layers 11, 12 are laminated on a transparent substrate 10 with a transparent intermediate film 33 being disposed therebetween.

The first information recording layer 11 consists of a first minute concave and convex surface 21 formed at the same time when the substrate 10 is formed by injection molding of resin such as polycarbonate or the like, and a semitransparent film 13 made of, for example, SiN and deposited thereon. The second information recording layer 12 is formed of a second minute concave and convex surface 22 laminated on the first information recording layer 11 by photopolymerization (2P) method, and a reflective film 14 formed of an Al evaporated film or the like and deposited thereon. A protective film 16 made of an ultraviolet curing resin, for example, is formed on the second information recording layer 12.

As shown in FIGS. 1 and 2, reading light L is irradiated on the optical recording medium from its substrate side thereof, thereby information being read out from the information recording layers thereof. In this case, as shown in FIG. 2, when information is read out from the optical recording medium having the first and second information recording layers 11, 12, respective rays of light L focused on the first and second information recording layers 11, 12 are irradiated on the first and second information recording layers 11, 12 from the same side, thereby the information being read out from the first and second information recording layers 11, 12.

However, each of the optical recording medium having a single information recording layer shown in FIG. 1 and the optical recording medium having two information recording layers shown in FIG. 2 has an asymmetrical structure in its thickness direction in view of its material. Therefore, immediately after the optical recording medium is manufactured, shrinkage of the ultraviolet curing resin forming the protective film 16 tends to warp the substrates 1 and 10 and to keep them in their warped states. Secular changes thereof mainly brings their deformation such as warps resulting from absorption or removal of vapor in the air. Therefore, it leads to an unsatisfactory operation of reading a signal by an optical pickup.

When the optical recording medium having a dilayer structure shown in FIG. 2 is formed, the first and second minute concave and convex surfaces 21, 22 forming the first and second information recording layers 11, 12 must be independently and respectively formed by injection molding or the 2P method. Therefore, it leads to low productivity.

SUMMARY OF THE INVENTION

In view of such aspects, it is an object of the present invention to provide a method of manufacturing an optical recording medium which has a structure symmetrical with respect to a thickness direction of the optical recording medium and which can easily be manufactured.

According to a first aspect of the present invention, when an optical recording medium having at least first and second minute concave and convex surfaces formed therein is manufactured, the first and second minute concave and convex surfaces are simultaneously molded on both surfaces of a substrate of the optical recording medium. Therefore, it is possible to manufacture a multilayer optical recording medium having an excellent symmetrical structure with respect to a vertical cross section direction of the substrate, i.e., in the thickness direction of the optical recording medium. Moreover, it is possible to effectively suppress the deformation thereof resulting from curing or shrinkage of an light curing resin or the like, absorption or removal of vapor in the air into or from a substrate, a transparent intermediate film or the like, and so on.

Since the first and second minute concave and convex surfaces are simultaneously formed on both of the surfaces of the substrate of the optical recording medium, it is possible to manufacture, with high productivity, the multilayer-structure optical recording medium which is very effectively used for increasing a capacity of recording information.

DETAILED DESCRIPTION OF THE PREFERRED EMBODIMENTS

A disk-like optical disk to which the present invention is applied will hereinafter be described. The present invention is not limited to such optical disk and its shape and can be applied to various optical recording media having information recording layers with minute concave and convex surfaces such as a magneto-optical disk, a phase-change disk, other card-like and sheet-like recording optical recording disk, or the like.

Figure 3:
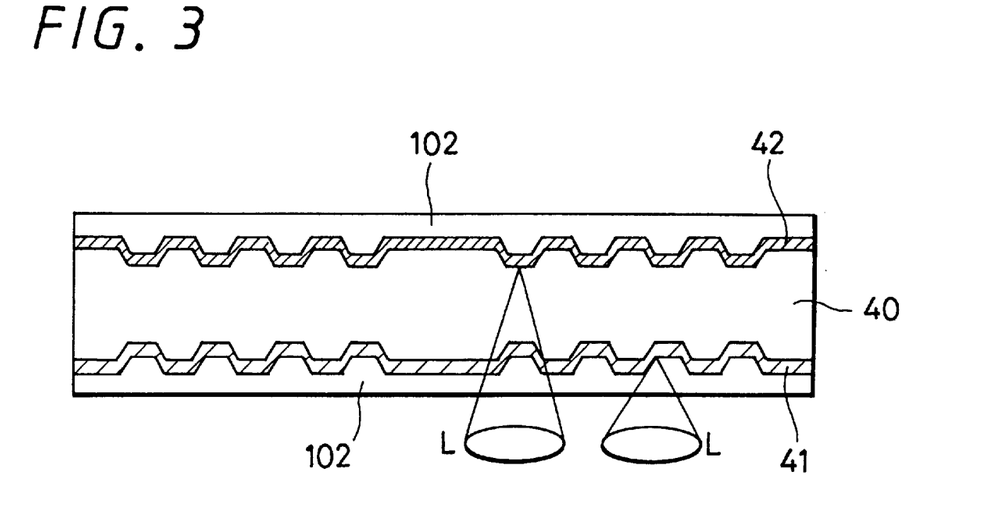
FIG. 3 is a schematic, cross-sectional view of a multilayer optical recording medium manufactured in accordance with a method according to the present invention.

A method of manufacturing an optical recording medium according to a first embodiment of the present invention relates to a method of manufacturing an optical recording medium having first and second information recording layers 41, 42 formed on both main surfaces of a substrate 40 shown in FIG. 3 by injection molding.

Figure 4:
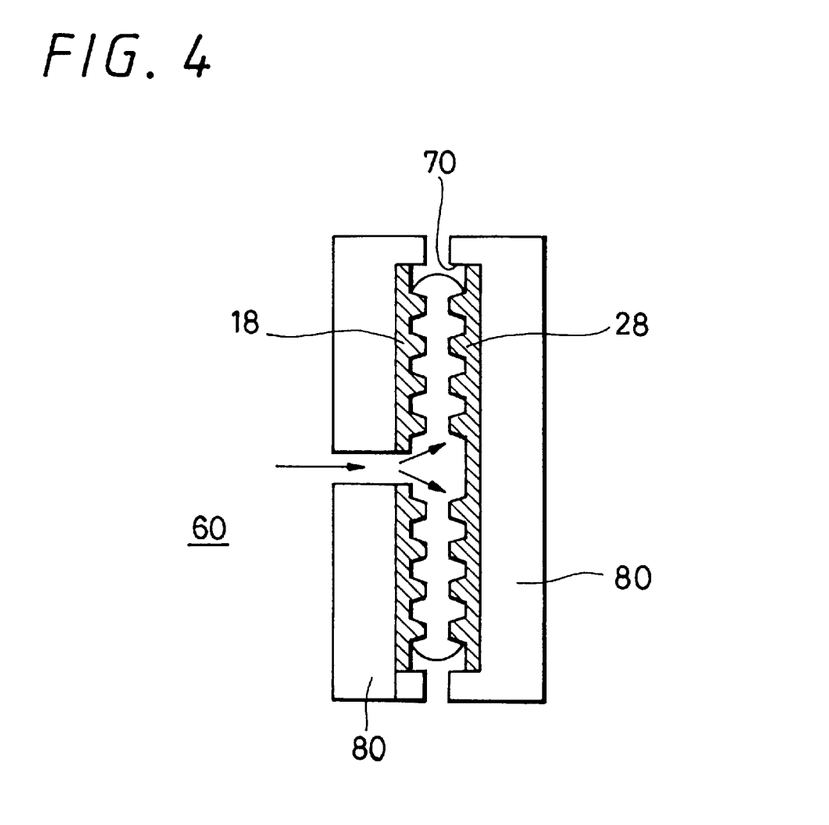
FIG. 4 is a schematic, cross-sectional view of an apparatus for manufacturing a substrate of a multilayer optical recording medium used in the method according to the present invention by way of example.

FIG. 4 is a diagram showing a substrate manufacturing apparatus 60 for molding the substrate 40. In this substrate manufacturing apparatus 60, a pair of mold dies 80, 80 are located so as to be opposed to each other at an interval of 0.3 mm, for example, which is equivalent to a thickness of the substrate 40, thereby a cavity 70 being formed. Each of the mold dies 80, 80 is made of a stainless metal.

The pair of mold dies 80, 80 used when the substrate 40 is molded have a first stamper 18 for transferring a first minute concave and convex surface 51 (shown in FIG. 5) forming a first information recording layer 41 and a second stamper 28 for transferring a second minute concave and convex surface 52 (shown in FIG. 5) forming the second information recording layer 42 both of which are disposed and held by respective vacuum chucks (not shown), for example.

Initially, a light-transmissive resin, e.g., a molten polycarbonate is poured into the cavity 70 to radiate its heat, and simultaneously the first and second minute concave and convex surfaces 51, 52 are transferred to the molten polycarbonate by the first and second stampers 18, 28 to solidify the molten polycarbonate.

Figure 5:
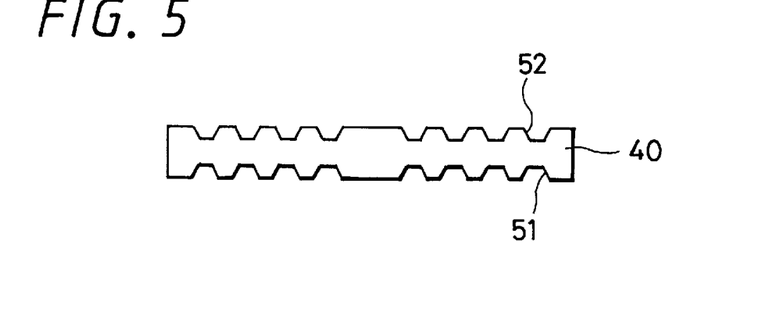
FIG. 5 is a schematic, cross-sectional view of a substrate forming a multilayer optical recording medium molded in accordance with the method according to the present invention.

When the above processing is carried out, there can be obtained the substrate 40 with its thickness of 0.3 mm having the first and second minute concave and convex surfaces 51, 52 respectively formed on both of the main surfaces thereof as shown in FIG. 5.

Figure 6:
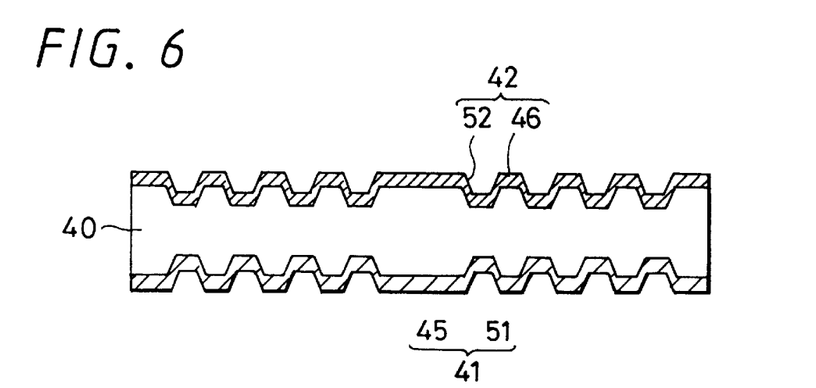
FIG. 6 is a diagram showing a process for manufacturing the multilayer optical recording medium according to the method of the present invention.

As shown in FIG. 6, a semitransparent film 45 for reflecting 30% to 50% of signal reading laser light is formed of a SiN sputtered film, for example, on the first minute concave and convex surface 51, thereby the first information recording layer 41 being formed.

A reflective film 46 for reflecting 80% to 100% of the signal reading laser light is deposited on the second minute concave and convex surface 52 by Al evaporation, thereby the second information recording layer 42 being formed.

Figure 7:
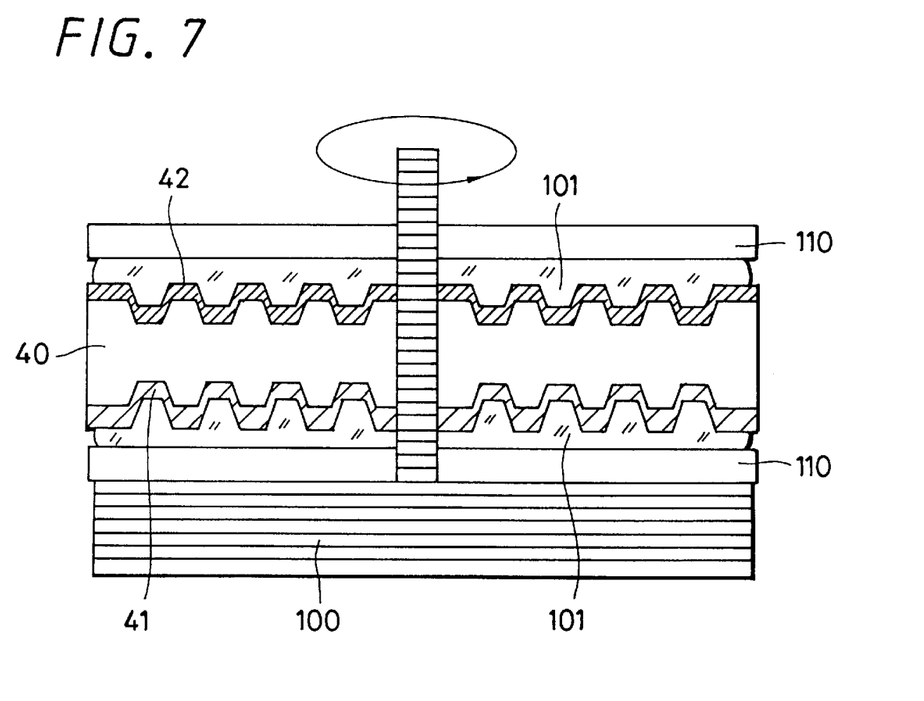
FIG. 7 is a diagram showing a process for manufacturing the multilayer optical recording medium according to the method of the present invention.

Then, as shown in FIG. 7, a liquid light curing resin 101 is coated on the first and second information recording layers 41, 42, sandwiched by smooth glass plates 110, 110, and then mounted on a horizontal stand 100. In this state, the horizontal stand 100 is rotated at high speed, thereby the liquid light curing resin 101 being spread thereon.

Figure 8:
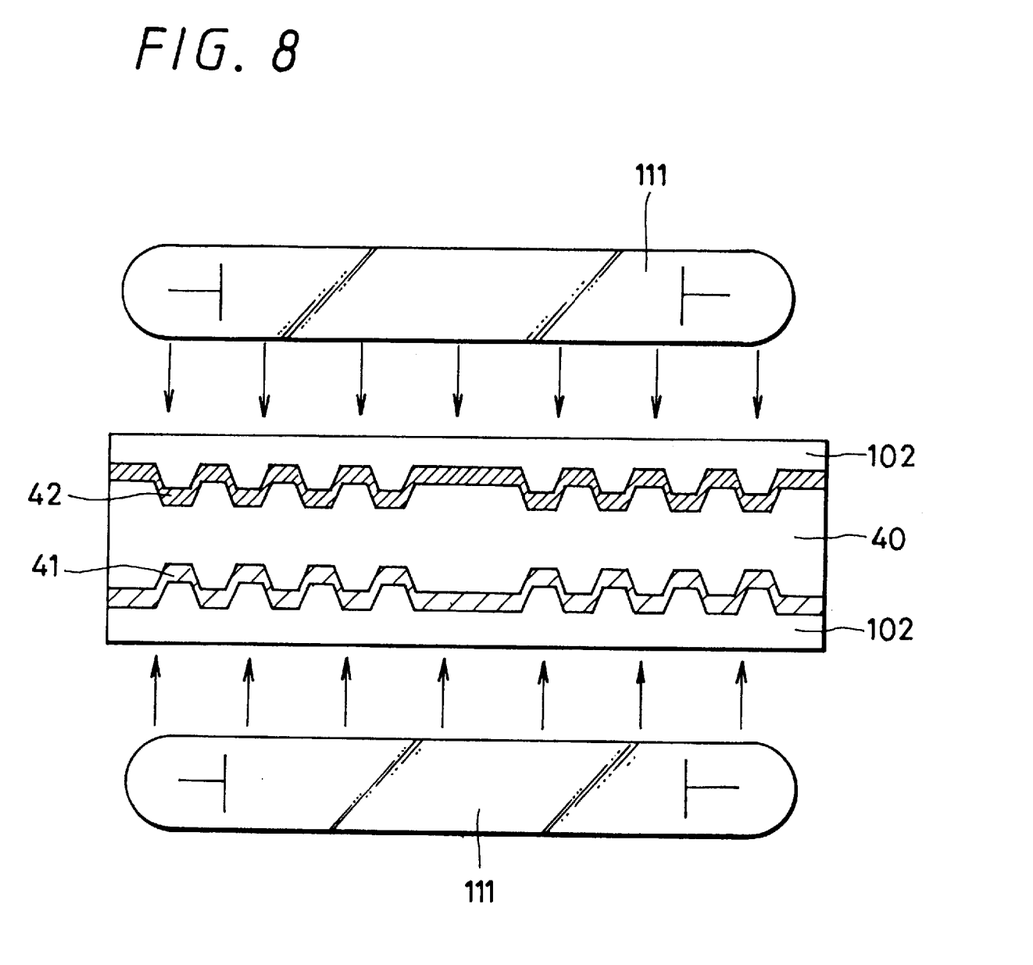
FIG. 8 is a diagram showing a process for manufacturing the multilayer optical recording medium according to the method of the present invention.

As shown in FIG. 8, ultraviolet rays, for example, are irradiated from lamps 111, 111 on liquid light curing resins 101 to cure the liquid light curing resins 101, 101. Thus, protective films 102, 102 are formed.

Thus, the optical recording medium having the first and second information recording layers 41, 42 formed on both of the main surfaces of the substrate 40 is manufactured.

A method of manufacturing an optical recording medium according to a second embodiment of the present invention relates to a manufacturing method of molding a substrate 40 by using a sheet formed of a light-transmissive resin having a uniform film thickness.

Figure 9:
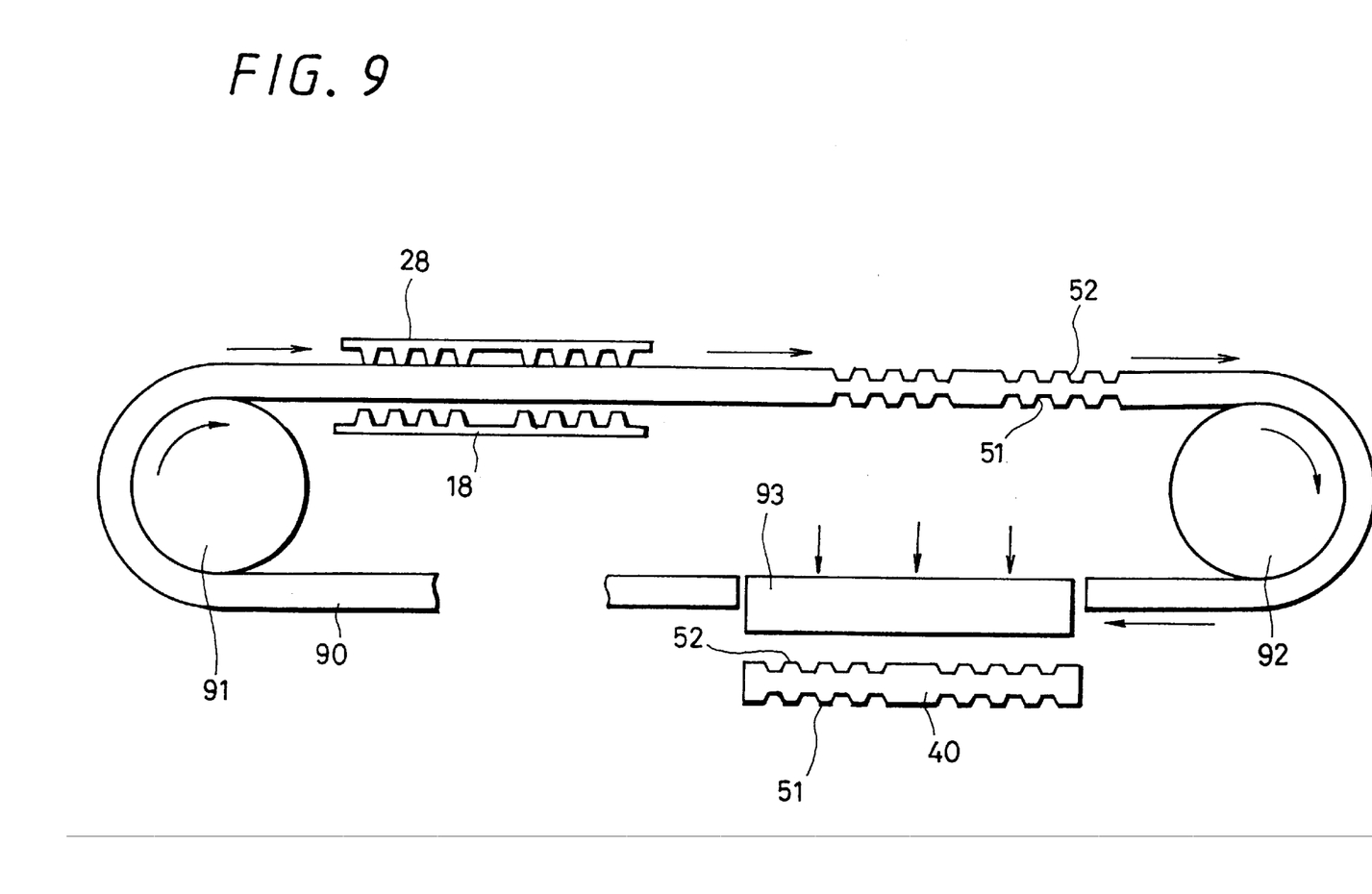
FIG. 9 is a diagram showing a process for manufacturing a substrate forming the multilayer optical recording medium according to the method of the present invention.

As shown in FIG. 9, a minute concave and convex surface such as a signal pit, a groove or the like is formed on a sheet 90 formed of a light-transmissive resin having a uniform film thickness, e.g., a thickness of 0.1 mm such as polycarbonate or polyolefin resin.

In this case, the stripe sheet 90 formed of the light-transmissive resin having the uniform film thickness is guided between guide rollers 91, 92. The first and second stampers 18, 28 which are heated are pressed on both of upper and lower surfaces of the sheet 90 at a position where the sheet 90 is conveyed between the guide rollers 91, 92, thereby the first and second minute concave and convex surfaces 51, 52 being transferred to and formed on the upper and lower surfaces of the sheet 90.

Then, a sheet punching machine 93 punches the sheet 90 so that a punched portion of the sheet 90 should be disk shaped, thereby the substrate 40 having the minute concave and convex surfaces 51, 52 formed on its both main surfaces being manufactured.

Similarly to the first embodiment, a semitransparent film 45 formed of a SiN sputtered film, for example, is formed, thereby a first information recording layer 41 being formed. Further, a reflective film 46 formed of an Al evaporated film, for example, is deposited on one surface of the substrate 40, thereby a second information recording layer 42 being formed.

If the method of transferring and forming the minute concave and convex surfaces 51, 52 by employing the sheet 90 formed of the light-transmissive resin having the uniform film thickness is employed, then it is possible to manufacture a thinner optical recording medium as compared with an optical recording medium according to the first embodiment in which the substrate is manufactured by injection molding.

Figure 10:
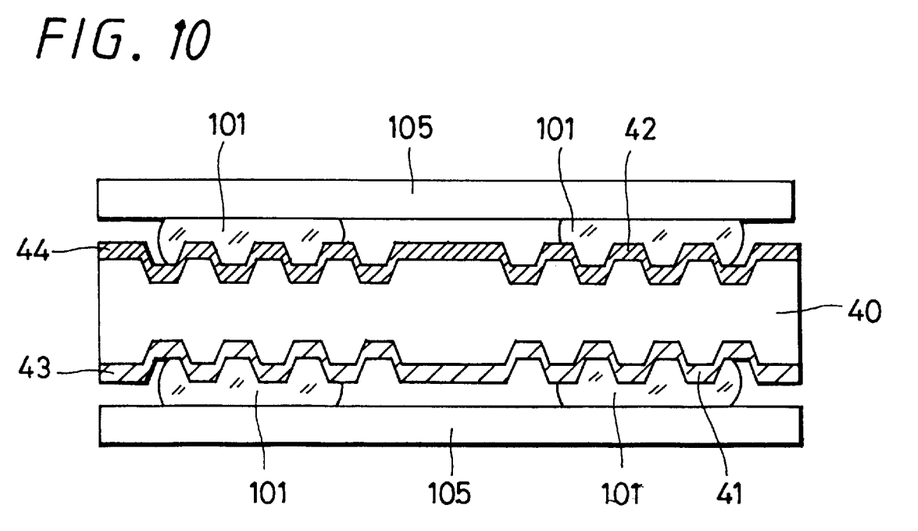
FIG. 10 is a diagram showing another example of a process for manufacturing the multilayer optical recording medium according to the method of the present invention.
Figure 11:
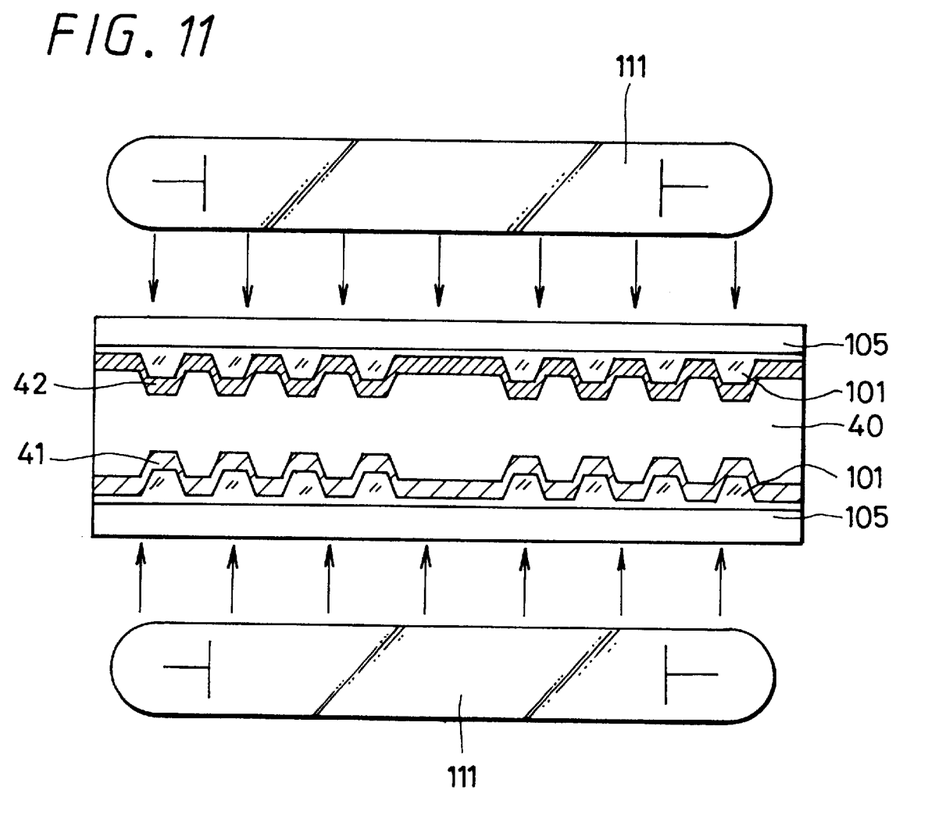
FIG. 11 is a diagram showing another example of a process for manufacturing the multilayer optical recording medium according to the method of the present invention.

A method of forming the protective film 102 is not limited to the above method. For example, as shown in FIG. 10, a liquid light curing resin 101 is coated on the first and second information recording layers 41, 42, and further transparent sheets 105, 105 made of light curing resin having a uniform thickness of 0.1 mm, for example, are pressed and deposited on both of the coated light-curing-resin films. As shown in FIG. 11, lamps 111, 111 irradiates rays of light on the liquid light curing resins 101, 101 from the outside to cure them, thereby the protective films 102, 102 being formed.

Figure 12:
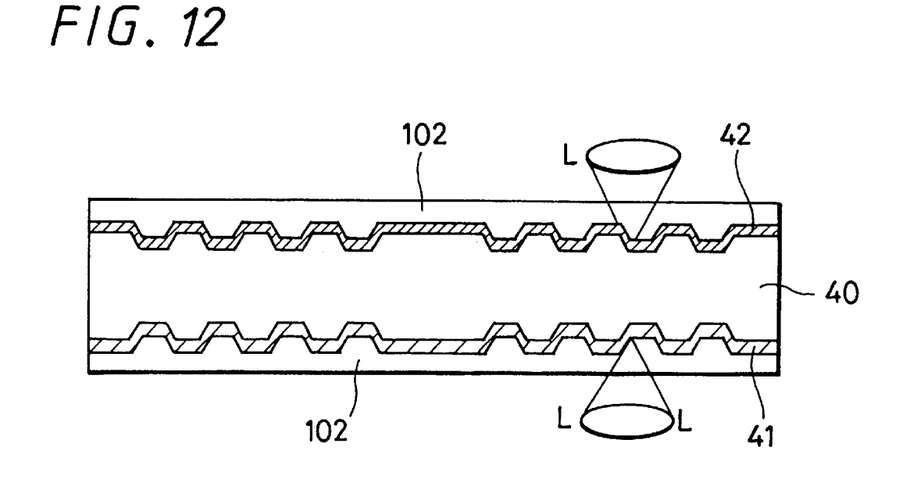
FIG. 12 is a schematic, cross-sectional diagram showing a double-side reading type optical recording medium having a dilayer structure.

While in the above embodiments a so-called single side reading type optical recording medium having a dilayer structure has been described, the method according to the present invention is not limited thereto and can be applied to fabrication of a so-called double-side reading type optical recording medium having a dilayer structure shown in FIG. 12. In this case, reflective films are deposited on first and second minute concave and convex surfaces of a substrate 40, thereby first and second information recording layer 41, 42 being formed. Further, protective films 102, 102 are formed on the respective first and second information recording layer 41. In this case, information is read out from the first and second information recording layers 41, 42 by irradiating rays L of light on both of the first and second information recording layers 41, 42.

While the method of manufacturing the optical recording medium having the dilayer structure has been described, the present invention is not limited thereto and can be applied to a method of manufacturing an optical recording medium having three layers or more.

A method of manufacturing an optical recording layer having four layers will hereinafter be described.

Figure 13:
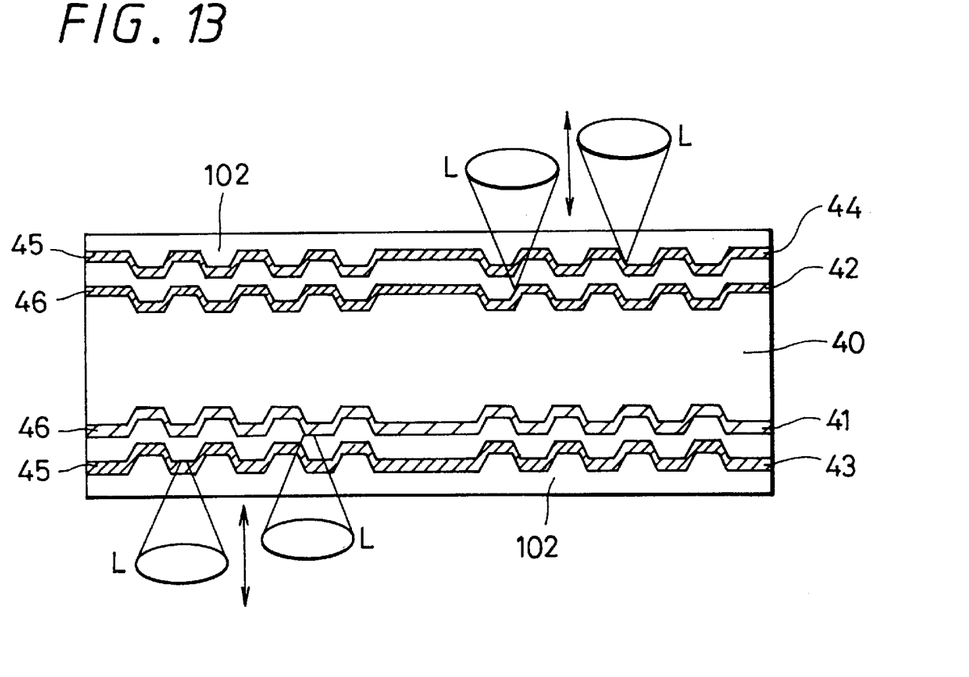
FIG. 13 is a schematic, cross-sectional diagram showing a double-side reading type optical recording medium having a structure formed of four layers.

In this case, as shown in FIG. 13 which is a schematic, cross-sectional view of the optical recording medium having a structure formed of four layers, a first information recording layer 41 is formed on one main surface of a substrate 40 having its thickness of 0.8 mm, and a third information recording layer 43 is formed thereon, while a second information recording layer 42 is formed on the other main surface of the substrate 40 and a fourth information recording layer 44 is formed on the layer 42.

The optical recording medium having such structure has information recording layers formed of three or four layers formed by depositing reflective films formed of Al evaporated films on respective minute concave and convex patterns of the first and second minute concave and convex surfaces 51, 52 to thereby form the first and second information recording layers 41, 42 and further laminating layers having different signal pits and different pregrooves on the first and second information recording layers 41, 42, respectively, upon manufacturing the optical recording medium having the dilayer structure.

In this case, as shown in FIG. 13, information is read out from the first and third information recording layers 41, 43 having the first and third concave and convex portions by irradiating rays L of light thereon from one side, and information is read out from the second and fourth information recording layers 42, 44 having the second and fourth concave and convex portions by irradiating rays L of light thereon from the other side.

Figure 14:
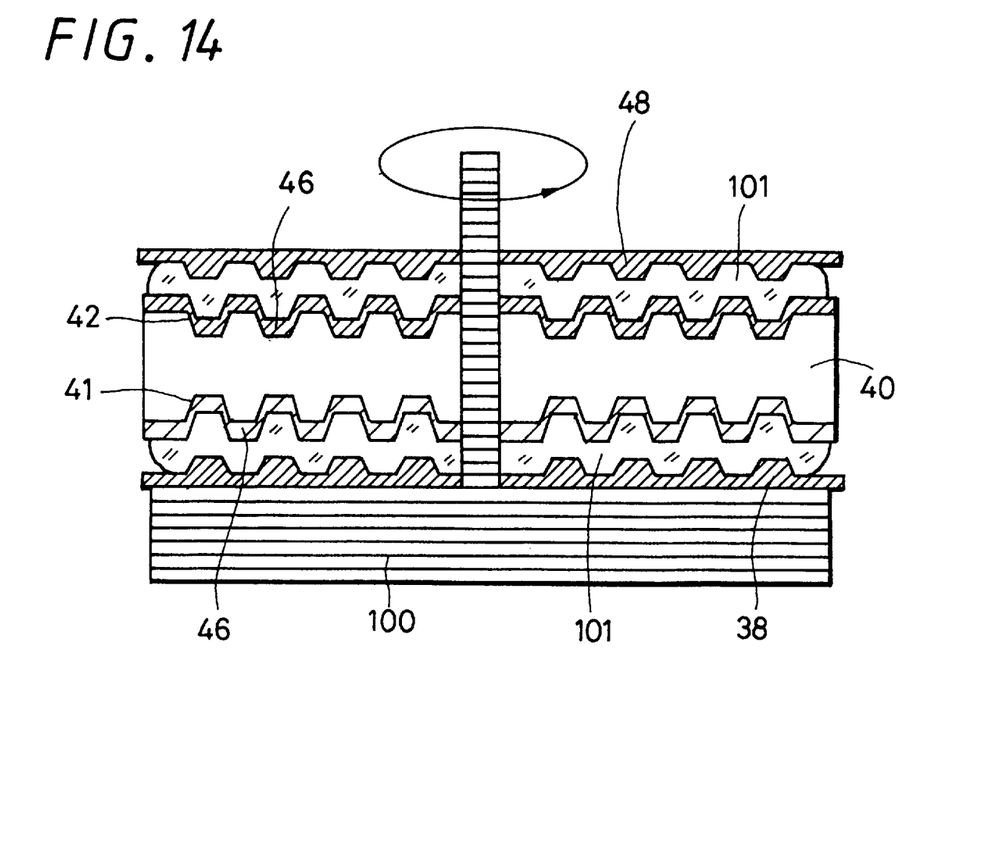
FIG. 14 is a diagram showing a process of manufacturing the double-side reading type optical recording medium having a structure formed of four layers.
Figure 15:
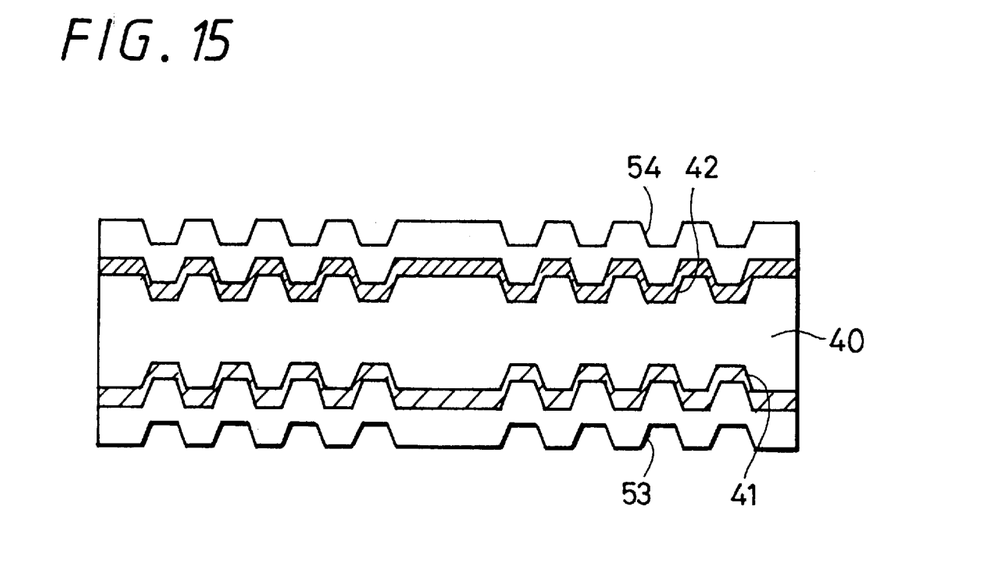
FIG. 15 is a diagram showing a process of manufacturing the double-side reading type optical recording medium having a structure formed of four layers.

In this case, reflective films 46 formed of, for example, Al evaporated films are respectively deposited on the first and second minute concave and convex surfaces 51, 52 respectively formed on both of main surfaces of a substrate 40 having its thickness of 0.8 mm, and then employed as the first and second information recording layers 41, 42. As shown in FIG. 14, a liquid light curing resin 101 is coated on the respective first and second information recording layers 41, 42 and third and fourth stampers 38, 48 are pressed on the coated liquid light curing resins 101, 101. Thereafter, as shown in FIG. 14, in a state that the substrate 40 coated with the light curing resin 101 is mounted on a horizontal stand 100, the liquid light curing resin 101 is spread by the spin coating. Then, as shown in FIG. 15, the third and fourth stampers 38, 48 are peeled off therefrom, thereby third and fourth minute concave and convex surfaces 53, 54 being respectively formed.

Thereafter, similarly to the above method according to the first embodiment, a semitransparent film 45 is formed on each of the third and fourth minute concave and convex surfaces 53, 54 and a protective film 102 is formed on each of the formed semitransparent film 45 similar to the manner used upon manufacturing the optical recording medium having the delayer structure. Thus, the optical recording medium having four layers can be manufactured.

Figure 16:
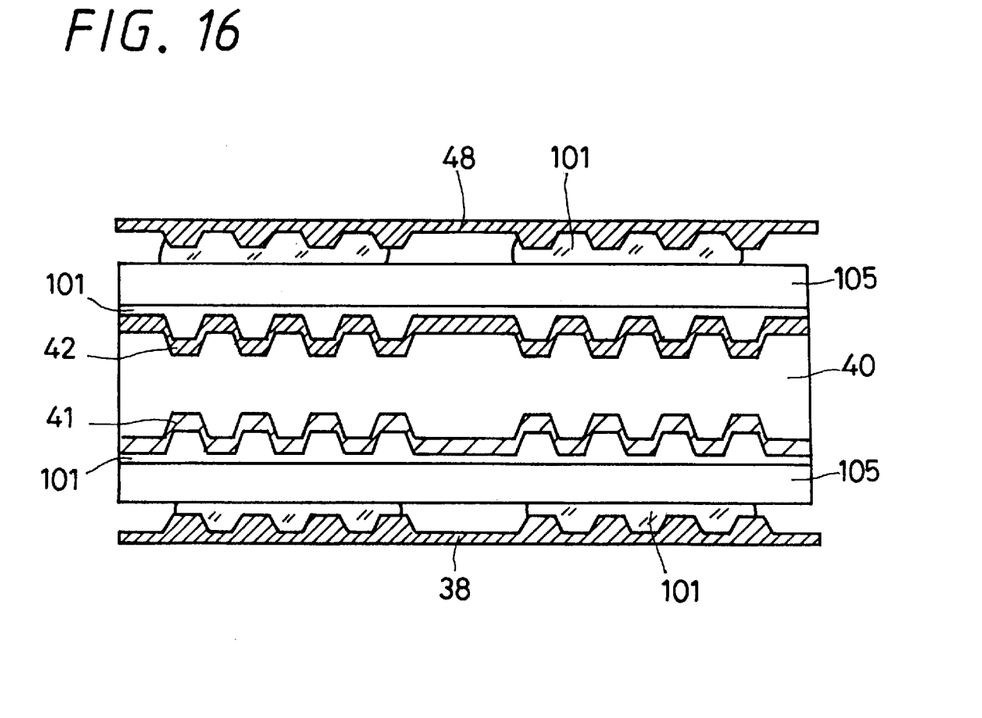
FIG. 16 is a diagram showing another example of a process of manufacturing the double-side reading type optical recording medium having a structure formed of four layers.
Figure 17:
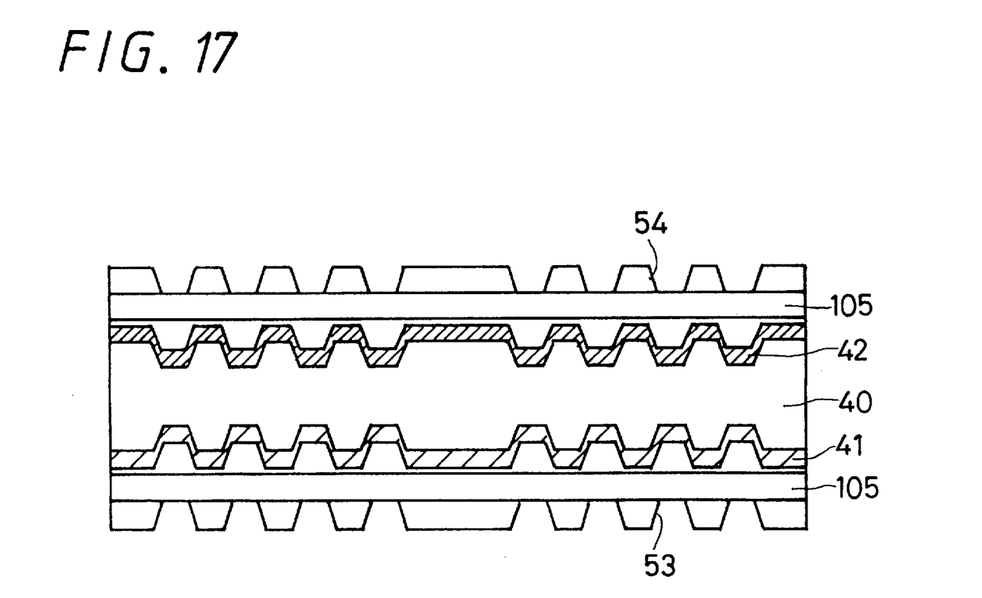
FIG. 17 is a diagram showing another example of a process of manufacturing the double-side reading type optical recording medium having a structure formed of four layers.

Even when the optical recording medium having four layers is manufactured, if the protective film 102 is formed by using a transparent sheet 105 as shown in FIG. 16, then a liquid light curing resin 101 is coated on the transparent sheets 105, 105 and third and fourth stampers 38, 48 are pressed on the respective liquid light curing resins 101, 101 to thereby transfer signal pits and pregrooves thereof. Thus, the third and fourth concave and convex portions 53, 54 can be manufactured as shown in FIG. 17.

When the above optical recording medium having a structure formed of four layers is manufactured, if a so-called mirror stamper having no signal transfer surface is employed as either of the third and fourth stampers 38, 48, then it is possible to manufacture an optical recording medium having a trilayer structure.

Figure 18:
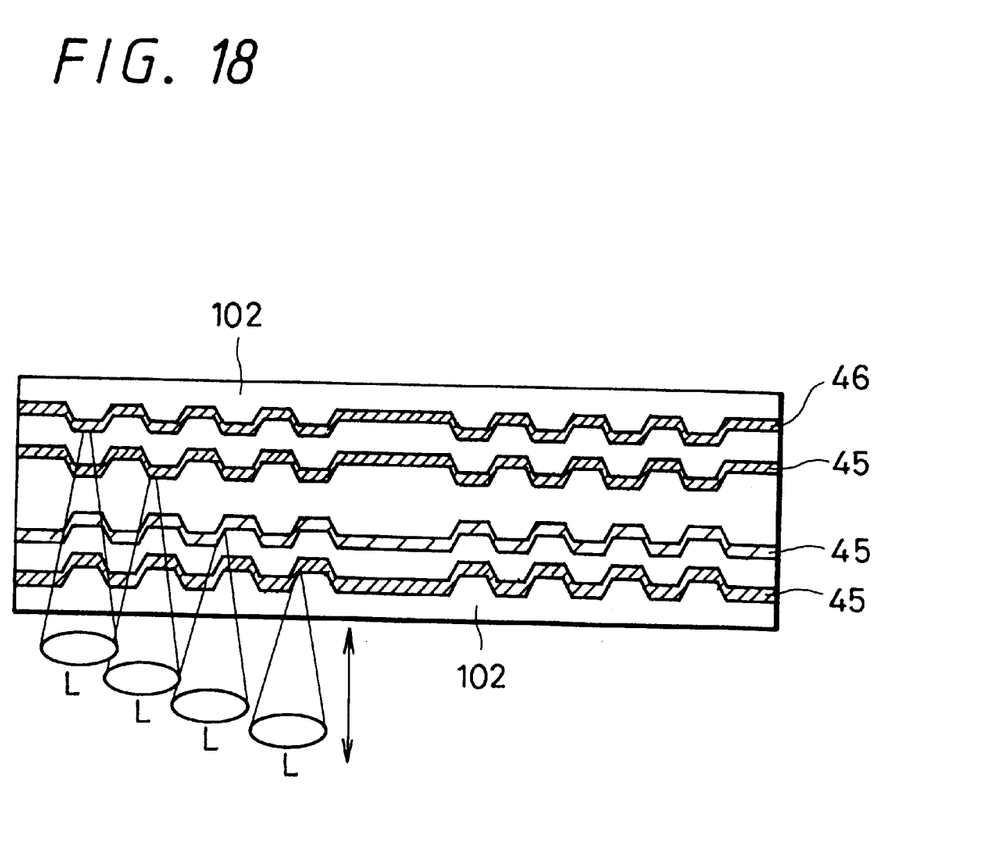
FIG. 18 is a schematic, cross-sectional view of a single-side reading type optical recording medium having a structure formed of four layers.

While in the above embodiment the method of manufacturing the double-side reading type optical recording medium having a structure formed of four layers has been described, the present invention is not limited thereto. As shown in FIG. 18, the first and second minute concave and convex surfaces 51, 52 are formed by employing a transparent sheet 90 having a uniform thickness shown in FIG. 9, and semitransparent films 45, 45 are formed thereon to thereby form first and second information recording layers 41, 42. Further, a semitransparent film 45 if formed on a third minute concave and convex surface 53 formed on the first information recording layer 41, and a reflective layer 46 is deposited on a fourth minute concave and convex surface 54 formed on the second information recording layer 42. Thus, it is possible to manufacture a single-side reading type optical recording medium having a structure formed of four layers.

While in the above embodiments the optical recording media are ROM type optical recording media, the present invention is not limited thereto and can be applied to a rewritable optical recording medium having a phase-change material in its information recording layer, an add-on optical recording medium, a write-once optical recording medium, or the like.

While each of the above-mentioned optical recording media has an information recording layer formed on at least one main surface, the present invention is not limited thereto and the other main surface can be used for forming a minute concave and convex surface for characters or a label.

As described above, according to the method of manufacturing the optical recording medium according to the present invention, in the optical recording medium having at least the first and second minute concave and convex surfaces 51, 52 formed therein, the first and second minute concave and convex surfaces are simultaneously formed on both of the surfaces of the substrate 40 by injection molding or by pressing the stampers on the sheet 90 having a uniform film thickness.

The method according to the present invention allows a multilayer optical recording medium to be manufactured with satisfactory symmetry in its thickness direction and makes it possible to suppress deformation thereof resulting from curing or shrinkage of the light curing resin or the like, the fact that the substrate, the transparent intermediate film or the like absorbs vapor in the air or is desiccated, or the like.

Since the method of simultaneously molding both sides of the multilayer optical recording medium or a so-called embossing method of simultaneously pressing stampers on both surfaces thereof is employed, it is possible to improve the productivity of the multilayer optical disk or the like which is very effective in increase of the capacity.

According to the present invention, it is possible to manufacture the multilayer optical recording medium having a satisfactory symmetry in structure.

Therefore, it is possible to suppress deformation of the multilayer optical recording medium resulting from curing or shrinkage of the light curing resin or the like, the fact that the substrate, the transparent intermediate film or the like absorbs vapor in the air or is desiccated, or the like.

Since the method of simultaneously molding both sides of the multilayer optical recording medium or the embossing method of simultaneously pressing stampers on both surfaces thereof is employed, it is possible to improve the productivity of the multilayer optical disk or the like which is very effective in increase of the capacity.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method of manufacturing an optical recording medium having at least first and minute concave and convex surfaces formed thereon comprising the steps of:

(a) simultaneously forming said first and second concave and convex surfaces on both surfaces of a transparent substrate of said optical recording medium using a first stamper and a second stamper;

(b) forming first and second reflective layers on said first and second surfaces, respectively; and (c) simultaneously forming first and second transparent layers of light curable material on said first and second reflective layers, respectively, and exposing said first and second transparent layers to a light source.

2. The method of manufacturing an optical recording medium according to claim 1, wherein said first and second stampers are used to form said first and second concave and convex surfaces simultaneously on both surfaces of said substrate via injection molding.

3. The method of manufacturing an optical recording medium according to claim 1, wherein said first and second stampers are used to form said first and second concave and convex surfaces simultaneously on both surfaces of said substrate by pressing first and second stampers thereon.

4. The method of manufacturing an optical recording medium according to claim 3, wherein said substrate is formed from a sheet of light-transmissive resin.

5. The method of manufacturing an optical recording medium according to claim 4, wherein said concave and convex surfaces on said substrate are formed by simultaneously pressing heated first and second stampers on both surfaces of the light-transmissive resin sheet.

6. The method of manufacturing an optical recording medium according to claim 4, wherein a
the step of forming said first and second concave surfaces includes the step of guiding and conveying a sheet made of the light-transmissive resin using a guide roller, and said first and second stampers are simultaneously pressed on both upper and lower surfaces of said sheet during said conveying step to simultaneously form first and second minute concave and convex surfaces on said sheet, and
wherein the method further comprises the step of punching said sheet having said concave and convex surfaces.

7. The method of manufacturing an optical recording medium according to claim 1, wherein the step of forming said first and second transparent layers includes the step of spreading said light curable material on said first and second surfaces.

8. The method of manufacturing an optical recording medium according to claim 1, wherein the step of simultaneously forming said first and second transparent layers includes the steps of:
simultaneously pressing transparent material forming said first and second transparent layers to said light curable material before said exposure to the light source; and
simultaneously bonding said transparent material to said first and second reflective layers by exposing said light curable material to said light source.

9. The method of manufacturing an optical recording medium according to claim 1, wherein the step of forming said first and second reflective layers includes forming comprises a semi-reflective coating on said first surface and forming a reflective coating on said second surface.

10. The method of manufacturing an optical recording medium according to claim 1, wherein step of forming said first and second reflective layers includes forming reflective coatings on said first and second surfaces, respectively.

11. A method of manufacturing an optical recording medium having a multilayer structure comprising the steps of:

(a) simultaneously forming said first and second concave and convex surfaces on both surfaces of a transparent substrate of said optical recording medium using a first stamper and a second stamper;

(b) forming a first reflective layer on said first concave and convex surface and forming a first semitransparent layer on said second concave and convex surface, respectively;

(c) simultaneously forming first and second transparent layers of light curable material on said first reflective layer and said first semitransparent layer, respectively, and exposing said first and second transparent layers to a light source;

(d) simultaneously forming a third and fourth concave and convex surfaces on said first and second transparent layers, respectively, using a third stamper and a fourth stamper;

(e) forming a second semitransparent layer on said third concave and convex surface and a second reflective layer on said fourth concave convex surface; and (e) forming third and fourth transparent layers on said second semitransparent layer and said second reflective layer, respectively.

12. The method of manufacturing an optical recording medium according to claim 11, wherein said step of forming said third and fourth transparent layers includes spreading light curable material on said first and second surfaces and exposing said third and fourth layers to the light source.

13. The method of manufacturing an optical recording medium according to claim 11, wherein the step of forming said third and fourth transparent layers includes bonding transparent material to said third and fourth reflective layers with light curable material spread on said third and fourth surfaces and exposing said third and fourth layers to the light source.

14. The method of manufacturing an optical recording medium according to claim 11, wherein the step of forming said first and second reflective layers include forming reflective coatings on said first and second surfaces, respectively, and wherein the step of forming said third and fourth reflective layers includes forming semi-reflective coatings on said third and fourth surfaces, respectively.

15. The method of manufacturing an optical recording medium according to claim 11, wherein the step of forming said first, second, and third reflective layers includes forming semi-reflective coatings on said first, second, and third surfaces, respectively, and wherein the step of forming said fourth reflective layer includes forming a reflective coating formed on said fourth layer.

16. A method of manufacturing an optical recording medium having at least first and second concave and convex surfaces formed thereon comprising the steps of:

(a) simultaneously forming said first and second concave and convex surfaces on both first and second surfaces of a film having a uniform thickness, by pressing first and second stampers thereon;

(b) forming first and second reflective layers, respectively, on said first and second concave and convex surfaces formed on said first and second surfaces;

(c) simultaneously forming first and second transparent layers of light curable material on said first and second reflective layers, respectively, and exposing said first and second transparent layers to a light source; and (d) forming said film into a disk shape by a punching machine.

17. A method of manufacturing an optical recording medium having at least first and second concave and convex surfaces formed thereon comprising the steps of:

(a) simultaneously forming said first and second concave and convex surfaces on both first and second surfaces of a film having a uniform thickness, by pressing first and second stampers thereon;

(b) forming first and second reflective layers, respectively, on said first and second concave and convex surfaces formed on said first and second surfaces;

(c) simultaneously forming first and second transparent layers of light curable material on said first and second reflective layers, respectively, and exposing said first and second transparent layers to a (d) forming third and fourth concave and convex surfaces on said first and second transparent layers, respectively, by pressing said first and second stampers thereon;

(e) forming third and fourth reflective layers, respectively, on said third and fourth concave and convex surfaces formed on said third and fourth surfaces;

(f) forming third and fourth transparent layers on said third and fourth reflective layers, respectively; and (g) punching said film into a disk shape.

18. A method of manufacturing an optical recording medium having a multi-layer structure comprising the steps of:

(a) simultaneously forming first and said second minute concave and convex surfaces on both surfaces of said optical recording medium using a first stamper and a second stamper;

(b) forming a first and a second reflective layer on said first concave and convex surfaces, respectively;

(c) simultaneously forming a first and a second transparent layer of light curable material on said first and second reflective layers, respectively, and exposing said first and said second transparent layers to a light source;

(g) forming a third and a fourth concave and convex surface on said first and said second transparent layers simultaneously by using a third stamper and a fourth stamper;

(h) forming a first and a second semitransparent layer on said third and said fourth concave and convex surfaces respectively; and (i) forming athird and a fourth transparent layer on said third and said fourth semitransparent layers, respectively.

19. A method of manufacturing an optical recording medium having a multi-layer structure comprising the steps of:

(a) simultaneously forming said first and said second concave and convex surfaces on both surfaces of said optical recording medium by employing a first stamper and a second stamper;

(b) forming a first reflective layer on said first concave and convex surfaces, and forming a first semitransparent layer on said second concave and convex surface, respectively;

(c) simultaneously forming a first and a second transparent layer of light curable material on said first reflective layer and said first semitransparent layer, respectively, and exposing said first and said second transparent layers to a light source;

(d) forming a third and a fourth concave and convex surface on said first and said second transparent layers simultaneously by pressing a third stamper and a fourth stamper thereon;

(e) forming a second and a third semitransparent layer on said first and second transparent layers, respectively; and (f) forming a third and a fourth transparent layers on said second and said third semitransparent layer, respectively.

* * * * *

UNITED STATES PATENT AND TRADEMARK OFFICE
CERTIFICATE OF CORRECTION

PATENT NO. : 6,210,609 B1
DATED : April 3, 2001
INVENTOR(S) : Minoru Takeda et al.

It is certified that error appears in the above-identified patent and that said Letters Patent is hereby corrected as shown below:

<u>Title page,</u>
Item [57], ABSTRACT,
Line 13, "an" should read -- a --.

<u>Column 7,</u>
Line 66, "minute" should read -- second --.

<u>Column 8,</u>
Line 2, "and convex surfaces on both surfaces of a transparent" should read -- and convex surfaces on both first and second surfaces of a transparent --.
Line 5, "(b) forming first and second reflective layers on said first" should read -- (b) forming first and second reflective layers, respectively, on said first --.
Line 6, "and second surfaces respectively; and" should read -- and second concave and convex formed on said first and second surfaces; and --.
Line 29, delete "a".
Line 36, delete "minute".
Line 59, delete "comprises".
Line 62, "medium according to claim 1, wherein step of forming said" should read -- medium according to claim 1, wherein the step of forming said --.

<u>Column 9,</u>
Line 1, delete "said".
Line 14, delete "simultaneously".
Line 15, "convex surfaces on said first and second transparent" should read -- convex surfaces simultaneously on said first and second transparent --.

UNITED STATES PATENT AND TRADEMARK OFFICE
CERTIFICATE OF CORRECTION

PATENT NO.    : 6,210,609 B1
DATED         : April 3, 2001
INVENTOR(S)   : Minoru Takeda et al.

It is certified that error appears in the above-identified patent and that said Letters Patent is hereby corrected as shown below:

Column 10,
Line 17, "and second transparent layers to a" should read -- and second transparent layers to a light source --.
Line 44, replace "(g)" with -- (d) --.
Line 48, replace "(h)" with -- (e) --.
Line 51, replace "(i)" with -- (f) --.

Signed and Sealed this

Twenty-first Day of October, 2003

JAMES E. ROGAN
*Director of the United States Patent and Trademark Office*